(No Model.) 2 Sheets—Sheet 1.

F. HADFIELD.
MACHINE FOR WORKING RUBBER.

No. 571,226. Patented Nov. 10, 1896.

Witnesses:
C. H. Raeder
H. A. James

Inventor
Frederick Hadfield
By James J. Sheehy
Attorney (No Model.) 2 Sheets—Sheet 2.
F. HADFIELD.
MACHINE FOR WORKING RUBBER.
No. 571,226. Patented Nov. 10, 1896.
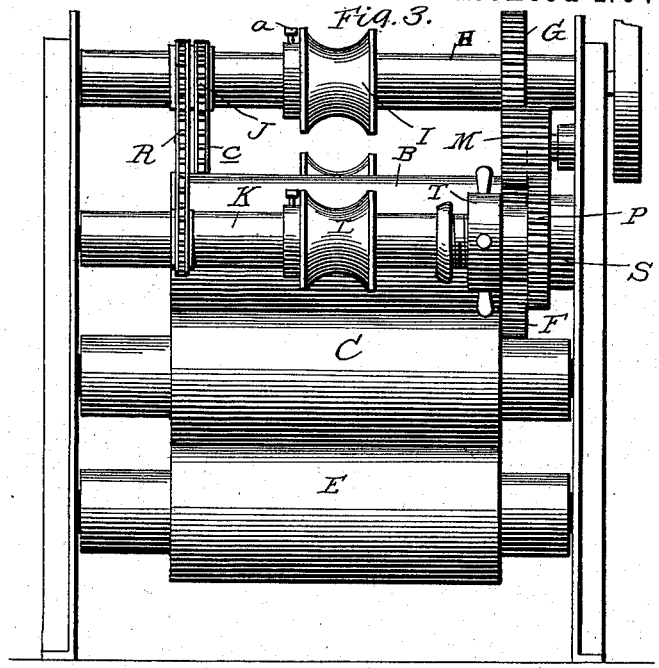
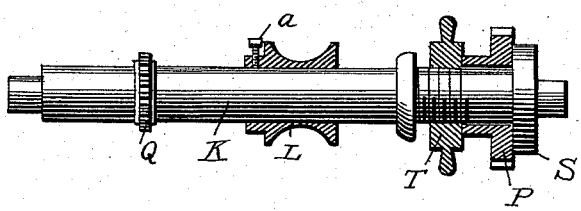
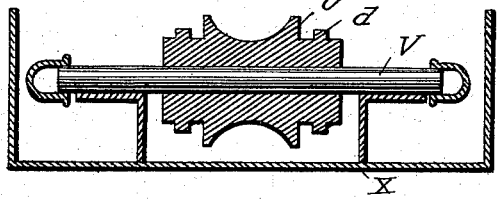

UNITED STATES PATENT OFFICE.

FREDERICK HADFIELD, OF WOONSOCKET, RHODE ISLAND.

MACHINE FOR WORKING RUBBER.

SPECIFICATION forming part of Letters Patent No. 571,226, dated November 10, 1896.

Application filed August 20, 1896. Serial No. 603,384. (No model.)

*To all whom it may concern:*

Be it known that I, FREDERICK HADFIELD, a citizen of the United States, residing at Woonsocket, in the county of Providence and State of Rhode Island, have invented certain new and useful Improvements in Machines for Working Rubber; and I do declare the following to be a full, clear, and exact description of the invention, such as will enable others skilled in the art to which it appertains to make and use the same.

Heretofore in the working or sheeting of crude rubber the rubber, prior to being subjected to the action of the calender-rolls, is first passed through a "cracker," which embodies two rolls and is designed to take the chill off the rubber, and is then passed several times through the "warmer," which is a machine having two hollow rolls kept warm by steam injected into the same, one of said rolls being rotated at a speed about three times that of the other. The rubber is fed to the warmer in lumps weighing about one hundred and fifty pounds each, and after being sufficiently heated it is rolled into pieces about five inches in diameter and thirty-six inches long, and is then laid upon a table by the attendant of the warmer, ready to be taken up by another attendant and carried to the attendant or operator of the calender-rolls. The delay incident to the transmission of the rubber from the warmer to the calender-rolls causes the rubber to cool and also causes the temperature of the different pieces to vary so that they will not form a continuous and uniform sheet when passed through the calender-rolls.

The general object of my invention is to provide means for carrying pieces of rubber from the warmer to the calender-rolls, so as to dispense with the services of one of the attendants, and to utilize such carrying means to maintain the temperature of the several pieces of rubber, so that when they reach the calender-rolls they will be as warm as when they leave the warmer, and will also be uniform in temperature, so as to insure the formation of a continuous and uniform sheet by the calender-rolls.

Other objects and advantages of the invention will be fully understood from the following description and claims when taken in conjunction with the annexed drawings, in which—

Figure 1:
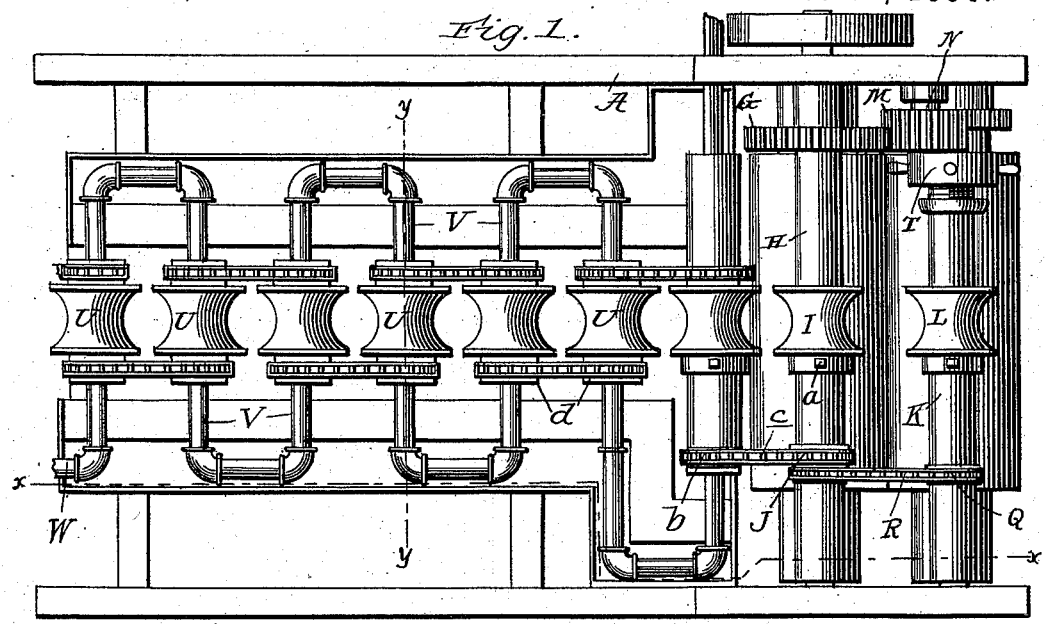
Figure 2:
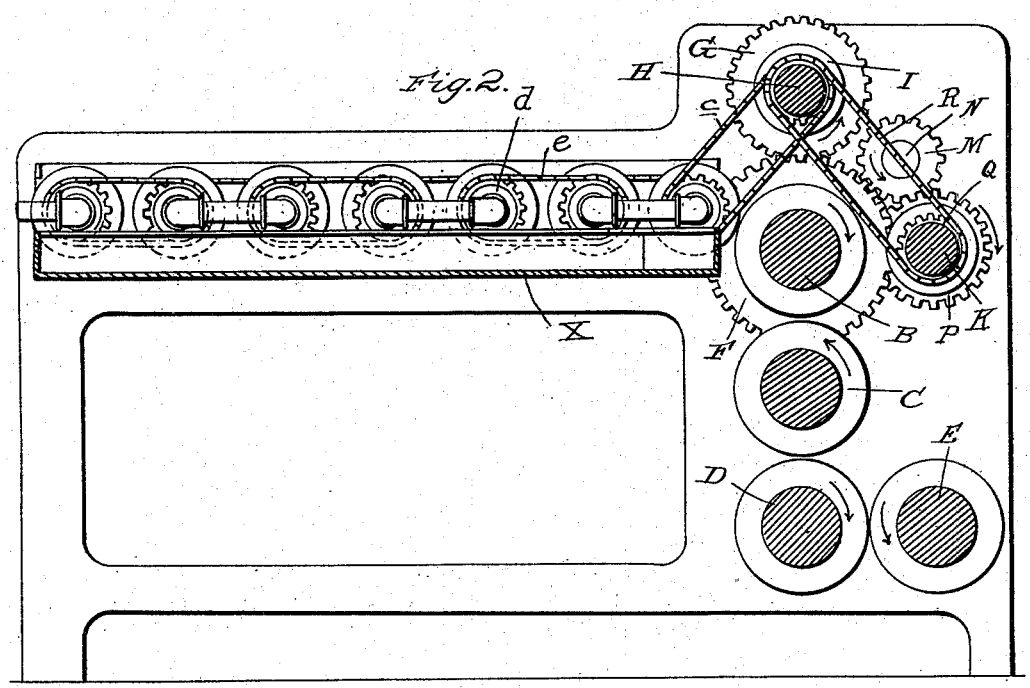

Figure 1 is a plan view illustrating the calender-rolls and my improved feeding apparatus in conjunction with the same. Fig. 2 is a longitudinal vertical section taken in the plane indicated by the line $xx$ of Fig. 1. Fig. 3 is an end elevation. Fig. 4 is a detail elevation, with parts in section, illustrating the friction-clutch; and Fig. 5 is a transverse section taken in a plane indicated by the line $yy$ of Fig. 1.

In the said drawings similar letters designate corresponding parts in all of the views, referring to which—

A indicates the main frame of the apparatus, which may be of any construction suitable to the purposes of my invention, and B, C, D, and E indicate ordinary calender-rolls, the roll E being figured upon its periphery, if desired, so as to emboss the rubber as it passes between the same and the roller D.

The several rollers B, C, D, and E are journaled in suitable bearings in the frame A, and the roller B is provided with a gear-wheel F, through the medium of which it is rotated in the direction indicated by arrow by the gear-wheel G, fixed on the drive-shaft H. The rollers C, D, and E are caused to rotate in the directions indicated by arrow by the friction incident to the sheet of rubber passing between them. The shaft H is provided with a guide-roller I, which is preferably fixed thereon by the set-screw $a$, and said shaft is also provided with a sprocket-wheel J, which is designed to transmit motion to the feed-rollers, (presently described,) and is loose on the shaft for a purpose presently set forth.

K indicates a shaft which carries a guide-roller L, and is arranged, as shown, with relation to the calender-roll B, and M indicates an idler-gear, which is mounted on a shaft N, and meshes with the gear F of roll B, as shown. This idler-gear M also meshes with a gear P on the shaft K, and the said shaft K is provided with a sprocket-wheel Q, which is connected with the loose sprocket-wheel J of the shaft H by the chain R, whereby it will be seen that when the calender-rolls are rotated and the gear P is fixed to turn with shaft K the sprocket-wheel J and consequently the feed-rolls connected therewith will also be rotated.

It is sometimes desirable to operate the calender-rolls B, C, D, and E without operating the feed-rolls, and to this end I mount the gear-wheel P loosely on the shaft K, between the fixed collars S of said shaft and the adjustable collar T, which is interiorly threaded to engage threads on the shaft. This construction permits of the gear P being rendered fast on the shaft K, when it is desired to rotate the feed-rolls in concert with the calender-rolls, and also permits of the said gear being rendered loose on the shaft when it is desired to operate the calender-rolls while the feed-rolls are idle. I prefer to employ the construction shown and described for rendering the gear P fast and loose on its shaft, but it is obvious that any other suitable construction may be employed if desired.

U indicates the feed-rolls of my improved apparatus, of which any suitable number may be employed. These feed-rolls are arranged in line with the guide-rolls I and L, and preferably have concave peripheries like said guide-rolls, as illustrated. The said feed-rolls are arranged and adapted to rotate upon the transverse portions V of a continuous pipe W, which is connected with a source of steam supply, (not illustrated,) whereby it will be seen that the said rolls will be uniformly heated and will consequently heat the pieces of rubber to a uniform degree until the same are delivered to the calender-rolls. It will also be seen that the transverse portions of the pipe W serve as arbors for the rolls U.

The feed-roll U, contiguous to the calender-rolls, is preferably provided with an extension, as shown, which has a sprocket-wheel *b* to receive a chain *c* from the loose sprocket-wheel I of the shaft H, and the several feed-rolls are provided with sprocket-wheels *d*, which are connected by chains *e*, whereby it will be observed that when the roll contiguous to the calender-rolls is rotated they will all be rotated and at a corresponding rate of speed. I prefer to rotate the feed-rolls U from the same shaft that drives the calender-roll B, for obvious reasons; but I do not desire to be understood as confining myself to the gearing shown for connecting the feed-rolls with the calender-rolls and for connecting the several feed-rolls, as any suitable gearing may be employed.

As before described, the rubber, after being passed through the warmer a sufficient number of times, is cut into pieces about five inches in diameter and thirty-six inches long. These pieces are placed one by one on the feed-rolls U and in the channel formed by the concave peripheries thereof by the attendant of the warmer. The pieces are also placed so that their ends lap, when they will in consequence of their warmth be united. The said pieces are thus conveyed to the calender, and when the foremost piece reaches the same the calender attendant reaches over the calender-roll B and draws said end forward as it is fed over the grooved roll L, and then guides it between the calender-rolls B and C. This manner of conducting the rubber through the calender is advantageous because, by reason of the friction between the roll L and the rubber the rubber will be drawn forward and the friction between it and the rolls U will assist in the rotation of said rolls U, which are positively driven through the medium of the mechanism described.

In addition to serving as a guide-roll the roll I on the shaft H is designed when the rubber is dry, that is to say, not sticky, to press the lapped ends of the pieces of rubber together, so as to unite the said pieces as they pass over the calender-roll B.

It will be readily observed from the foregoing that my improvements render it unnecessary to employ an attendant to carry the "feeds" or pieces of rubber from the warmer to the calender, and that they serve to uniformly heat the said pieces and deliver the same to the calender-rolls equally as warm as when they leave the warmer, which is an important advantage and a desideratum in rubber working.

In order to retain the heat which is radiated by the pipe W about the rubber, and also deflect the same against the rubber, I provide the pan X, (better shown in Fig. 5,) in which the pipe W and the feed-rolls U are arranged, as illustrated.

Having described my invention, what I claim is—

1. An apparatus for feeding soft rubber comprising a pipe adapted to be connected with a source of steam supply and having the transverse portions, and feed-rolls journaled on the said transverse portions of the pipe, substantially as and for the purpose set forth.

2. In a rubber-working machine, the combination of a main frame, calender-rolls journaled in said frame, a pipe supported by the main frame and adapted to be connected with a source of steam supply and having the transverse portions, and rolls, for conveying rubber from a warmer to the calender rolls, journaled on the transverse portions of the pipe, substantially as and for the purpose set forth.

3. In a rubber-working machine, the combination of a main frame, calender-rolls journaled in the main frame, feed-rolls arranged in the main frame and having sprocket-wheels, a gear-wheel fixed with respect to one of the calender-rolls, a drive-shaft arranged above said calender-roll and having a gear meshed with the gear thereof and also having a loose sprocket-wheel, a chain connecting said sprocket-wheel and the sprocket-wheel of the feed-roll contiguous to the calender-rolls, sprocket-chains connecting the several feed-rolls, a shaft K, arranged in advance of the uppermost calender-roll and having a gear-wheel and also having a sprocket-wheel, a chain connecting said sprocket-wheel and the sprocket-wheel on the drive-shaft, a pinion meshing with the gear-wheel on the calender-roll and also meshing with the gear-wheel on the shaft K, and means for heating the feed-rolls, substantially as and for the purpose set forth.

4. In a rubber-working machine, the combination of a main frame, calender-rolls arranged in said frame, feed-rolls also arranged in said frame, a roll L, arranged in advance of the uppermost calender-roll, gearing intermediate of said roll L, and the feed-rolls for rotating the latter and means for rotating the roll L, and the calender-rolls, substantially as and for the purpose set forth.

5. In a rubber-working machine, the combination of a main frame, calender-rolls arranged in said frame, feed-rolls also arranged in line in said frame and having concave peripheries, a roll L, arranged in advance of the uppermost calender-roll and having a concave periphery, a roll I, arranged above the uppermost calender-roll and also having a concave periphery, means for rotating the calender-rolls and the rolls L, I, and gearing intermediate of the roll L, and the feed-rolls for rotating the latter, substantially as specified.

6. An apparatus for feeding soft rubber comprising a frame, a pipe adapted to be connected with a source of steam supply and having the transverse portions, feed-rolls journaled on the said transverse portions of the pipe, and a pan arranged below the rolls and pipe and adapted to deflect the heat against the rubber mass as it passes over the rolls, substantially as specified.

In testimony whereof I affix my signature in presence of two witnesses.

FREDERICK HADFIELD.

Witnesses:
GEO. W. SPAULDING,
CAROLINE R. MASON.